(12) United States Patent
McGuire

(10) Patent No.: US 6,871,718 B2
(45) Date of Patent: Mar. 29, 2005

(54) AUTOMATICALLY ADJUSTABLE REAR SUSPENSION FOR TRIKE

(76) Inventor: Larry L. McGuire, 358 Blue Sky Dr., Port Orange, FL (US) 32129

( * ) Notice: Subject to any disclaimer, the term of this patent is extended or adjusted under 35 U.S.C. 154(b) by 168 days.

(21) Appl. No.: 10/058,203

(22) Filed: Jan. 29, 2002

(65) Prior Publication Data

US 2003/0141678 A1 Jul. 31, 2003

(51) Int. Cl.$^7$ ................................................ B62K 5/02
(52) U.S. Cl. ...................................................... 180/210
(58) Field of Search ................................ 180/210, 215, 180/124.103, 124.109; 280/62, 98

(56) References Cited

U.S. PATENT DOCUMENTS

| | | | |
|---|---|---|---|
| 3,740,070 A | * 6/1973 | Butler et al. | 280/683 |
| D246,776 S | * 12/1977 | Moore | D12/110 |
| 4,153,266 A | 5/1979 | Uhls | |
| 4,248,455 A | * 2/1981 | Manning | 280/6.152 |
| 4,275,900 A | 6/1981 | Andreoli et al. | |
| 4,359,716 A | 11/1982 | Miyamaru et al. | |
| 4,437,535 A | * 3/1984 | Winchell et al. | 180/215 |
| 4,453,616 A | * 6/1984 | Porter | 180/210 |
| 4,536,001 A | 8/1985 | Wagner | |
| 4,662,468 A | * 5/1987 | Ethier | 180/215 |
| 4,796,901 A | * 1/1989 | Furukawa | 280/835 |
| 4,913,255 A | * 4/1990 | Takayanagi et al. | 180/227 |
| 5,033,762 A | 7/1991 | Rakowski | |
| 5,098,114 A | * 3/1992 | Jones | 280/284 |
| 5,374,077 A | * 12/1994 | Penzotti et al. | 280/683 |
| 5,566,971 A | * 10/1996 | Perlot | 280/124.109 |
| 5,649,719 A | * 7/1997 | Wallace et al. | 280/124.156 |
| 5,690,046 A | * 11/1997 | Grzech, Jr. | 440/12.5 |
| 5,785,345 A | * 7/1998 | Barlas et al. | 280/124.165 |
| 5,899,291 A | * 5/1999 | Dumais | 180/209 |
| 6,003,628 A | 12/1999 | Jurrens et al. | |
| 6,068,276 A | 5/2000 | Kallstrom | |
| 6,149,142 A | * 11/2000 | Penzotti | 267/64.19 |
| 6,193,005 B1 | 2/2001 | Jurrens | |
| 6,263,994 B1 | 7/2001 | Eitel | |
| 6,332,623 B1 | * 12/2001 | Behmenburg et al. | 280/124.16 |

* cited by examiner

*Primary Examiner*—Faye M. Fleming
(74) *Attorney, Agent, or Firm*—Paul S. Rooy P.A.

(57) ABSTRACT

An automatically adjustable rear suspension. A supply of pressurized gas is pneumatically connected to a valve, and at least one air shock is also pneumatically connected to the valve. A pushrod is mechanically connected between a trike frame and a trike swing arm, and actuates the valve in order to maintain the distance between the trike frame and the trike swing arm at a factory pre-set value. Each air spring is disposed between an L arm rigidly attached to the trike swing arm, and the trike frame. In the preferred embodiment, a gas shock absorber was also disposed between the trike frame and the trike swing arm.

19 Claims, 3 Drawing Sheets

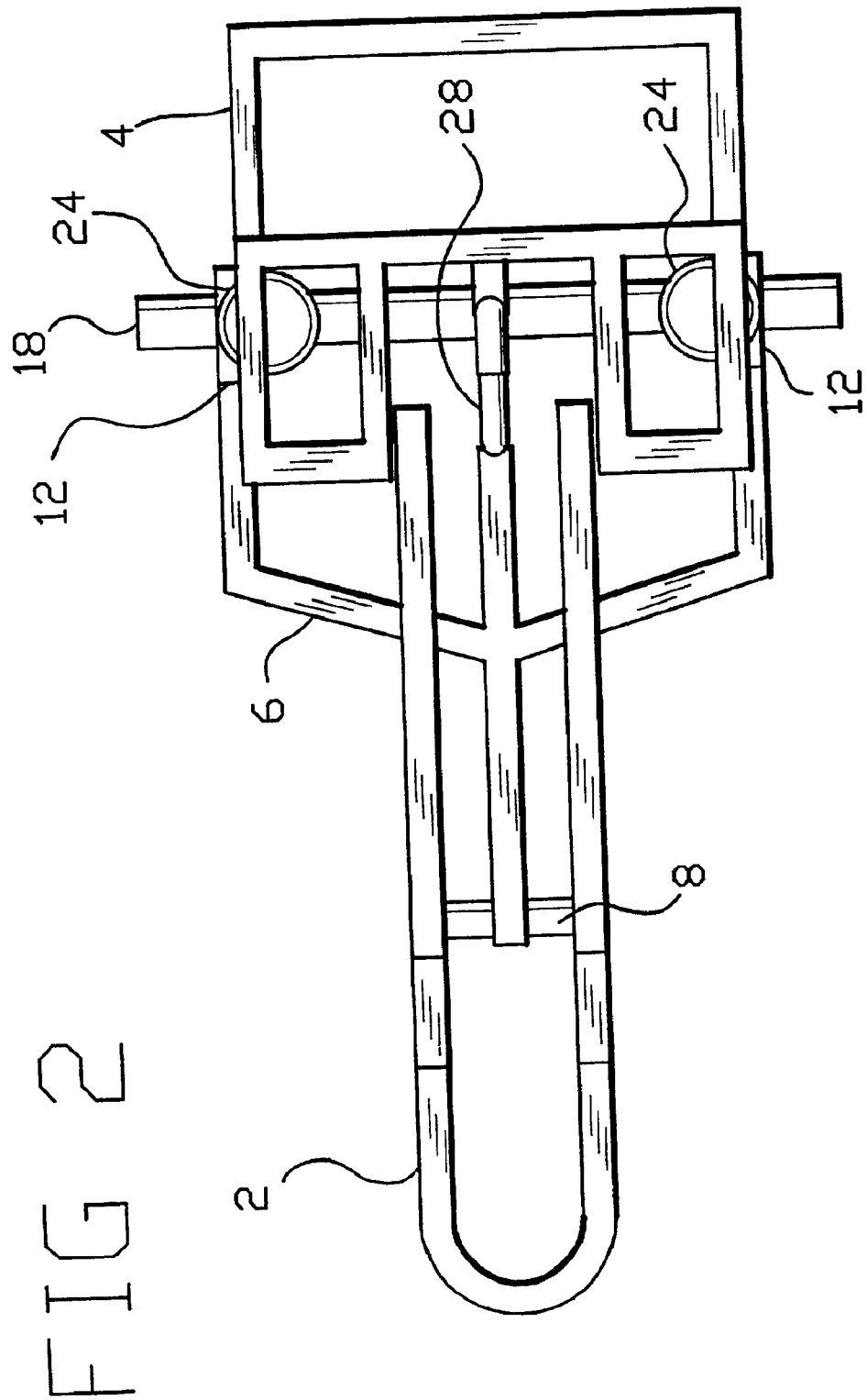

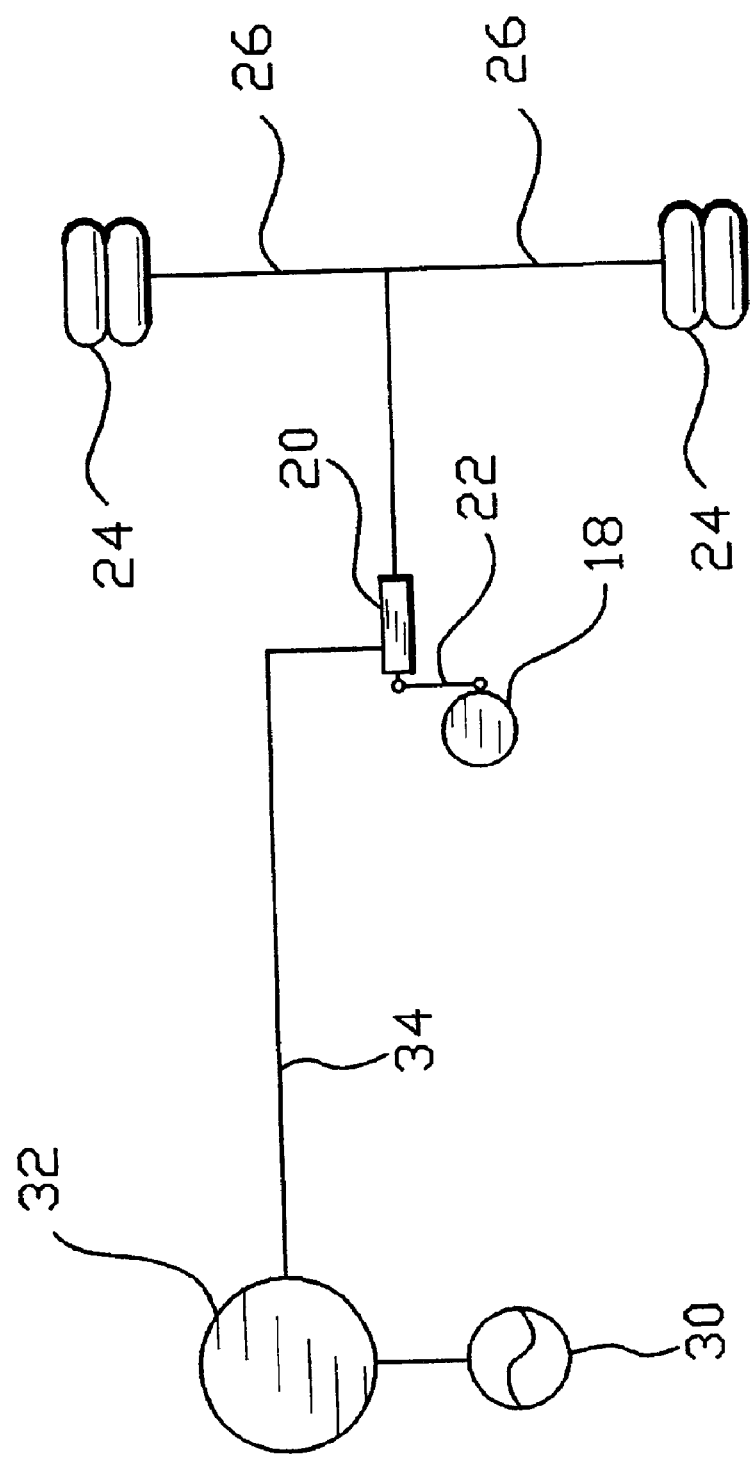

U S 6,871,718 B2

AUTOMATICALLY ADJUSTABLE REAR SUSPENSION FOR TRIKE

FIELD OF THE INVENTION

This invention relates to motorized trikes, and in particular to an automatically adjustable rear suspension for trike.

BACKGROUND OF THE INVENTION

Motorcycles comprise an important part of our transportation system, and have been around for over a century. Gottlieb Daimler, a German engineer, is generally credited with inventing and building the first motorcycle in 1885. He mounted a four-stroke piston engine to a wooden bicycle frame. Following a few decades of development, the motorcycle became a reliable, useful vehicle during the early 1900's.

While today's motorcycles do not differ significantly in appearance from the early models, they do incorporate important improvements. Modern motorcycles have stronger frames, more powerful engines and more dependable brakes. Larger, softer seats make riding more comfortable, and hydraulic springs help lessen road shocks.

During recent decades, as the disposable income and affinity for comfort of motorcycle afficionados have increased, large touring motorcycles have become popular. These motorcycles provide unparalleled stability, comfort and power to their riders.

Still another motorcycle refinement which has gained recent popularity is the three-wheel conversion of large touring motorcycles. This conversion typically involves installing an automotive rear end on an existing motorcycle frame, resulting in one front wheel and two rear drive wheels. This three wheel conversion, also known as a "trike", affords its riders increased comfort and stability.

One problem associated with modern trikes is keeping the motorcycle frame at the correct angle relative to the surface upon which the trike rests. It is important to maintain the motorcycle frame at the correct angle relative to the surface upon which the trike rests in order to optimize the handling characteristics and ride comfort of the trike. This problem arises especially when drivers of different weights occupy the front seat, or when a passenger climbs into the rear seat. Although front-to-rear leveling arrangements have been taught within the art for conventional two-wheel motorcycles, Applicant is not aware of the existence of any such systems which are usable on trikes. Thus, it would be desirable to provide an automatically adjustable rear suspension for trike which maintains the motorcycle frame at the correct angle relative to the surface upon which the trike rests.

Another problem associated with currently available trikes is a phenomenon known as pushback. Pushback is the reaction of the motorcycle steering wheel to bumps which the rear wheels see. For example, if the left rear wheel hits a bump, then the front wheel will tend to veer right due to pushback. Conversely, if the right rear wheel hits a bump, then the front wheel will tend to veer left. Thus, it would be desirable to provide an automatically adjustable rear suspension for trike which minimizes pushback.

SUMMARY OF THEE INVENTION

Accordingly, it is an object of the present invention to provide a an automatically adjustable rear suspension for trike which maintains the motorcycle frame at the correct angle relative to the surface upon which the trike rests. Design features allowing this object to be accomplished include a compressor pneumatically connected to an accumulator, at least one air spring pneumatically connected to the accumulator through a valve, and a valve pushrod connecting the valve to an axle. Advantages associated with the accomplishment of this object include optimization of the handling characteristics and ride comfort of the trike.

It is another object of the present invention to provide a provide an automatically adjustable rear suspension for trike which minimizes pushback. Design features allowing this object to be accomplished include an air spring mounted between a trike frame and an L arm associated with each rear wheel. Benefits associated with the accomplishment of this object include increased trike controllability and rider comfort.

BRIEF DESCRIPTION OF THE DRAWINGS

The invention, together with the other objects, features, aspects and advantages thereof will be more clearly understood from the following in conjunction with the accompanying drawings.

Three sheets of drawings are provided. Sheet one contains FIG. 1. Sheet two contains FIG. 2. Sheet three contains FIG. 3.

FIG. 2 is a top view of a motorcycle frame with trike frame and trike swing arm attached, upon which the instant automatically adjustable rear suspension for trike is installed.

FIG. 3 is a plan view of a schematic diagram of the instant automatically adjustable rear suspension for trike.

DETAILED DESCRIPTION OF THE PREFERRED EMBODIMENT

Figure 1:
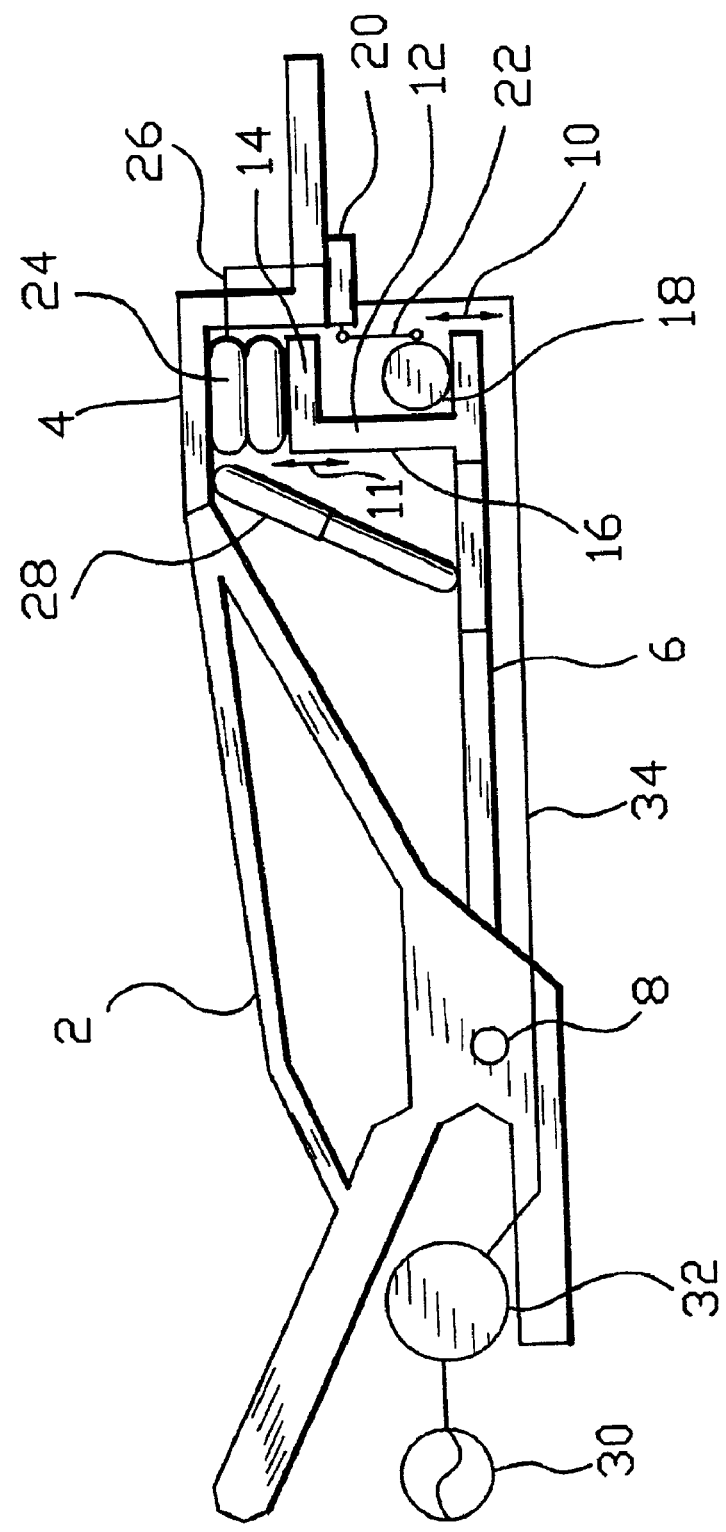
FIG. 1 is a side view of a motorcycle frame with trike frame and trike swing arm attached, upon which the instant automatically adjustable rear suspension for trike is installed.

Referring now to FIG. 1, we observe a side view of motorcycle frame 2 with trike frame 4 and trike swing arm 6 attached, upon which the instant automatically adjustable rear suspension is installed. Trike swing arm 6 is pivotably attached to motorcycle frame 2 at pivot point 8. Thus, trike swing arm 6 is free to pivot relative to motorcycle frame 2 around pivot point 8 as indicated by arrow 10. Axle 18 is rigidly attached to trike swing arm 6.

Referring now also to FIG. 2, a pair of L arms 12 is rigidly attached to trike swing arm 6. Each L arm 12 comprises an L arm horizontal member 14 rigidly attached to an L arm vertical member 16. An air spring 24 is sandwiched between each L arm horizontal member 14 and trike frame 4. The extent to which air springs 24 are inflated determines the angle of motorcycle frame 2 and trike frame 4 relative to a surface upon which the motorcycle rests, as indicated by arrow 11.

The extent to which air springs 24 are inflated is determined by valve 20. Valve 20 is a commercially available height air control valve which is normally closed, and which has two open positions: one open position inflates air springs 24 through air spring supply line 26, and the other open position deflates air springs 24 through air spring supply line 26.

Valve 24 receives its supply of pressurized gas from accumulator 32 through valve supply line 34. Accumulator 32 is supplied by compressor 30, which runs off the motorcycle electrical system. Valve 20 is actuated by valve pushrod 22, which measures the distance between trike frame 4 and trike swing arm 6. The length of valve pushrod 22 is set at the factory, and in effect determines the proper angle of trike frame 4 relative to the surface upon which the motorcycle rests. The indication and control system of valve 20 provides for a 30–35 second delay in actuation, which prevents road bumps and other temporary inputs from causing valve chatter.

In the preferred embodiment, gas shock absorber 28 was disposed between trike swing arm 6 and trike frame 4, in order to provide an optimum suspension.

FIG. 3 is a plan view of a schematic diagram of the instant automatically adjustable rear suspension. Compressor 30 supplies accumulator 32, which in turn supplies valve 20 through valve supply line 34. Valve 20 is mechanically connected to axle 18 by means of valve pushrod 22. Valve 20 is pneumatically connected to air springs 24 via air spring supply lines 26.

In operation, when valve pushrod 22 informs valve 20 that trike frame 4 is too low, the indication and control system of valve 20 provides for a 30–35 second delay in actuation to prevent road bumps and other temporary inputs from causing valve chatter. Following this anti-chatter delay, valve 20 directs compressed gas to air springs 24 through air spring supply lines 26, thus inflating air springs 24 and increasing the height of trike frame 4 above a surface upon which the motorcycle rests. The action of raising trike frame 4 has the effect of changing the angle of the motorcycle relative to the surface upon which it rests, because the motorcycle will pivot about its front wheel.

When trike frame 4 is at the factory pre-set optimum height (and consequently the angle of the motorcycle relative to the surface upon which it rests is optimized), valve pushrod 22 directs valve 20 to cease inflating air springs 24.

Similarly, when valve pushrod 22 informs valve 20 that trike frame 4 is too high, the indication and control system of valve 20 provides for a 30–35 second delay in actuation to prevent road bumps and other temporary inputs from causing valve chatter. Following this anti-chatter delay, valve 20 permits gas to be released from air springs 24 through air spring supply lines 26, thus deflating air springs 24 and decreasing the height of trike frame 4 above a surface upon which the motorcycle rests. This action of lowering trike frame 4 has the effect of changing the angle of the motorcycle relative to the surface upon which it rests, because the motorcycle will pivot about its front wheel.

When trike frame 4 is at the factory pre-set optimum height {and consequently the angle of the motorcycle relative to the surface upon which it rests is optimized}, valve pushrod 22 directs valve 20 to cease inflating air springs 24.

In the preferred embodiment, trike frame 4, valve pushrod 22, and trike swing arm 6 (including L arms 12), were factory metal fabrications. Compressor 30, accumulator 32, valve supply line 34, valve 20, air spring supply lines 26, air springs 24 and gas shock absorber 28 were commercially available components.

While a preferred embodiment of the invention has been illustrated herein, it is to be understood that changes and variations may be made by those skilled in the art without departing from the spirit of the appending claims.

DRAWING ITEM INDEX 2 motorcycle frame
4 trike frame
6 trike swing arm
8 pivot point
10 arrow
11 arrow
12 L arm
14 L arm horizontal member
16 L arm vertical member
18 axle
20 valve
22 valve pushrod
24 air spring
26 air spring supply line
28 gas shock absorber
30 compressor
32 accumulator
34 valve supply line

I claim:

1. An automatically adjustable rear suspension for a trike comprising a supply of pressurized gas pneumatically connected to a valve, at least one air spring pneumatically connected to said valve, said air spring being disposed between a trike arm and a trike frame, said valve being mechanically attached to said swing arm by means of a valve pushrod, said trike swing arm comprising at least one L arm, each said L arm comprising an L arm horizontal member rigidly attached to an L arm vertical member, each said air spring being disposed between one said L arm horizontal member and said trike frame.

2. The automatically adjustable rear suspension for a trike of claim 1 wherein said trike swing arm further comprises an axle, said valve pushrod mechanically connecting said axle and said valve.

3. The automatically adjustable rear suspension for a trike of claim 2 further comprising a gas shock absorber attached at one extreme to said trike frame and at an opposite extreme to said trike swing arm.

4. The automatically adjustable rear suspension for a trike of claim 3 wherein said supply of pressurized gas comprises an air compressor.

5. The automatically adjustable rear suspension for a trike of claim 4 wherein said supply of pressurized gas comprises an accumulator pneumatically connected to said compressor.

6. The automatically adjustable rear suspension for a trike of claim 5 wherein said accumulator is pneumatically connected to said valve by means of a valve supply line, and wherein said valve is connected to said at least one air spring by means of an air spring supply line.

7. An automatically adjustable rear suspension for a trike comprising a supply of pressurized gas pneumatically connected to a valve, two air springs pneumatically connected to said valve, each said air spring being disposed between a trike swing arm and a trike frame, said trike swing arm being pivotably attached to a motorcycle frame at a pivot point, said trike frame being rigidly attached to said motorcycle frame, said valve being mechanically attached to said swing arm by means of a valve pushrod.

8. An automatically adjustable rear suspension for a trike comprising a supply of pressurized gas pneumatically connected to a valve, two air springs pneumatically connected to said valve, each said air spring being disposed between a trike swing arm and a trike frame, said trike swing arm being pivotably attached to a motorcycle frame at a pivot point, said trike frame being rigidly attached to said motorcycle frame, said valve being mechanically attached to said sing arm by means of a valve pushrod, said trike swing arm comprising two L arms, each said L arm comprising an L arm horizontal member rigidly attached to an L arm vertical member, each said air spring being disposed between one said L arm horizontal member and said trike frame.

9. The automatically adjustable rear suspension for a trike of claim 8 wherein said trike swing arm further comprises an axle, said valve pushrod mechanically connecting said axle and said valve.

10. The automatically adjustable rear suspension for a trike of claim 9 further comprising a gas shock absorber attached at one extreme to said trike frame and at an opposed extreme to said trike swing arm.

11. The automatically adjustable rear suspension for a trike of claim 10 wherein said supply of pressurized gas comprises an air compressor.

12. The automatically adjustable rear suspension for a trike of claim 11 wherein said supply of pressurized gas comprises an accumulator pneumatically connected to said compressor.

13. The automatically adjustable rear suspension for a trike of claim 12 wherein said accumulator is pneumatically connected to said valve by means of a valve supply line, and wherein said valve is connected to said at least one air spring by means of an air spring supply line.

14. A motorized tricycle comprising an automatically adjustable rear suspension for a trike, said automatically adjustable rear suspension for a trike comprising a supply of pressurized gas pneumatically connected to a valve, two air springs pneumatically connected to said valve, each said air spring being disposed between a trike swing arm and a trike frame, said trike swing arm being pivotably attached to a motorcycle frame at a pivot point, said trike frame being rigidly attached to said motorcycle frame, said valve being mechanically attached to said swing arm by means of a valve pushrod.

15. A motorized tricycle comprising an automatically adjustable rear suspension for a trike, said automatically adjustable rear suspension for a trike comprising a supply of pressurized gas pneumatically connected to a valve, two air springs pneumatically connected to said valve, each said air spring being disposed between a trike swing arm and a trike frame, said trike swing arm being pivotably attached to a motorcycle frame at a pivot point, said trike frame being rigidly attached to said motorcycle frame, said valve being mechanically attached to said swing arm by means of a valve pushrod, said trike swing arm comprising two L arms, each said L arm comprising an L arm horizontal member rigidly attached to an L arm vertical member, each said air spring being disposed between one said L arm horizontal member and said trike fame.

16. The motorized tricycle comprising automatically adjustable rear suspension for a trike of claim 15 wherein said trike swing arm further comprises an axle, said valve pushrod mechanically connecting said axle and said valve.

17. The motorized tricycle comprising automatically adjustable rear suspension for a trike of claim 16 further comprising a gas shock absorber attached at one extreme to said trike frame and at an opposite extreme to said trike swing arm.

18. The motorized tricycle comprising automatically adjustable rear suspension for a trike of claim 17 wherein said supply of pressurized gas comprises an air compressor electrically connected to a motorized tricycle electrical system.

19. The motorized tricycle comprising automatically adjustable rear suspension for a trike of claim 18 wherein said supply of pressurized gas comprises an accumulator pneumatically connected to said compressor.

* * * * *

UNITED STATES PATENT AND TRADEMARK OFFICE
CERTIFICATE OF CORRECTION

PATENT NO. : 6,871,718 B2
DATED : March 29, 2005
INVENTOR(S) : McGuire, Larry L.

It is certified that error appears in the above-identified patent and that said Letters Patent is hereby corrected as shown below:

Column 1,
Line 26, " afficionados..." should be -- *afficionados...* --

Column 3,
Line 50, "...{..." should be -- ...(... --

Column 4,
Line 22, "...a trike arm..." should be -- ...a trike swing arm... --
Line 64, "...sing arm..." should be -- ...swing arm... --

Signed and Sealed this

Second Day of August, 2005

JON W. DUDAS
*Director of the United States Patent and Trademark Office*